Dec. 2, 1969    H. DEPLANTE    3,481,562
MOVABLE OBTURATOR DEVICE BETWEEN AIRFOILS AND THE
AIRFRAME OF VARIABLE GEOMETRY AIRCRAFT
Filed Nov. 27, 1967    3 Sheets-Sheet 1

INVENTOR
Henri Deplante
BY
Watson, Cole, Grindle + Watson
ATTORNEYS

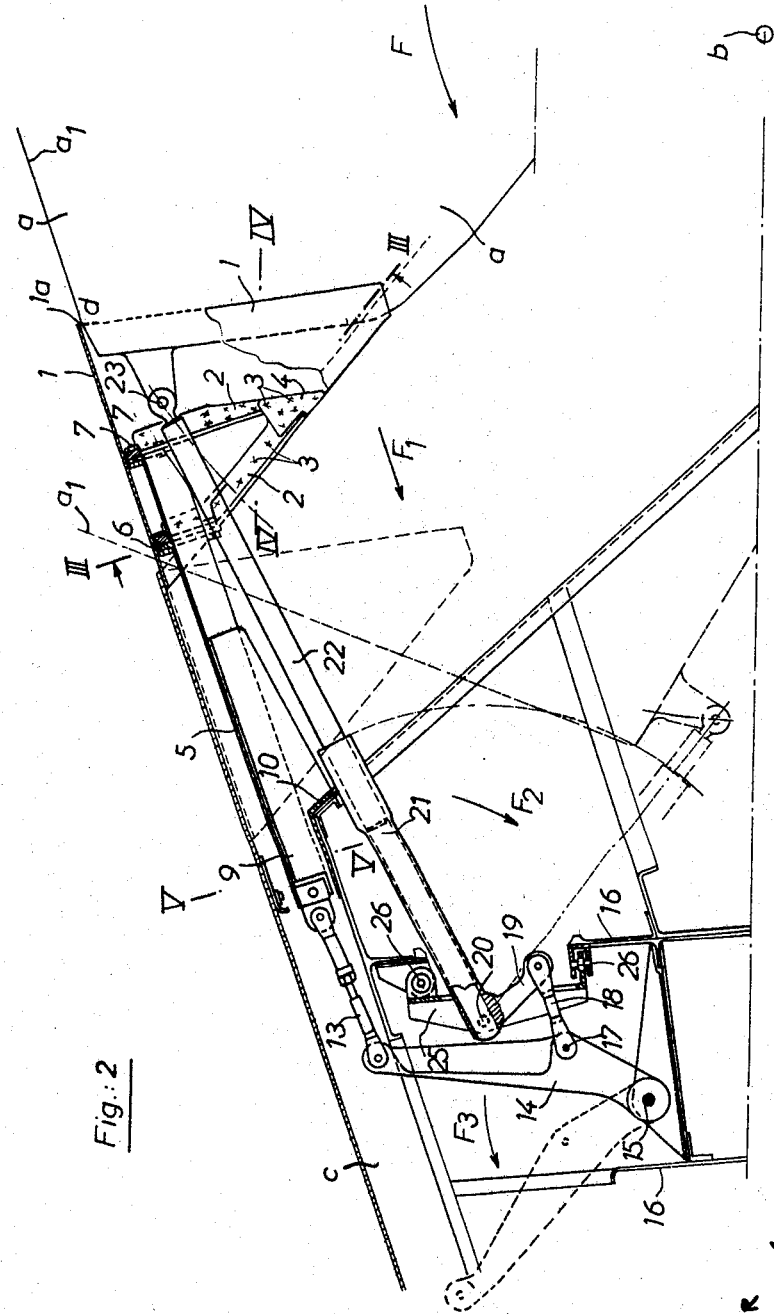

Dec. 2, 1969  H. DEPLANTE  3,481,562
MOVABLE OBTURATOR DEVICE BETWEEN AIRFOILS AND THE
AIRFRAME OF VARIABLE GEOMETRY AIRCRAFT
Filed Nov. 27, 1967  3 Sheets-Sheet 3

INVENTOR
Henri Deplante
BY
Watson, Cole, Grindle + Watson
ATTORNEYS

United States Patent Office 3,481,562
Patented Dec. 2, 1969

3,481,562
MOVABLE OBTURATOR DEVICE BETWEEN AIRFOILS AND THE AIRFRAME OF VARIABLE GEOMETRY AIRCRAFT
Henri Deplante, Paris, France, assignor to Avions Marcel Dassault, Saint-Cloud, Hauts-de-Seine, France, a company of France
Filed Nov. 27, 1967, Ser. No. 685,849
Claims priority, application France, Jan. 17, 1967, 91,478
Int. Cl. B65c 3/38
U.S. Cl. 244—46         7 Claims

ABSTRACT OF THE DISCLOSURE

This invention relates to a variable geometry aircraft having the wings pivotally connected to the fuselage and fairings which produce aerodynamic continuity between the fuselage and the wings in the fully deployed position of the latter, and more particularly to an obturator device for each wing for maintaining said aerodynamic continuity when the wing is in other positions, said device comprising an obturator element forming an extension of the fairing and a motion-transmission mechanism connecting said element to the wing to move said element as a function of the displacement of the wing.

---

Figure 1:
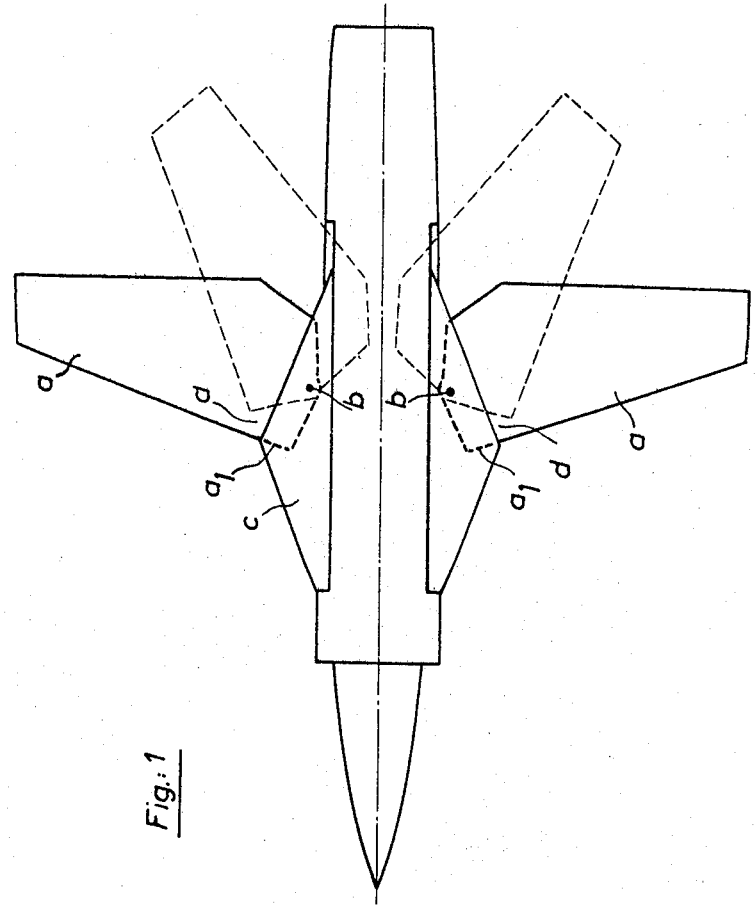

This invention relates to variable geometry aircraft the wings of which are able to pivot in relation to the fuselage of the aircraft in order to produce different wing configurations.

In aircraft of this type, continuity of the aerodynamic surfaces of wings and fuselage is ensured at either side of the fuselage by a fixed structure or fairing of profiled form, the inside of which is engaged by the leading edge of the corresponding wing. However, since the wing pivot is located on the fuselage at a certain distance from the leading edge of the fairing and the wing, there is a discontinuity between the leading edge of the said fixed structure and that of the wing, in certain wing positions.

According to the invention, a variable geometry aircraft includes an obturator device which is movable in relation to the fairing and connected to the wing through a motion-transmitting mechanism, the said device following the displacement of the wing in order to extend the surface of the fixed structure up to the wing whatever the angular position of the latter, thus making good the discontinuity at the leading edge.

In one advantageous embodiment, the obturator device is constituted by a sheet of material folded back on itself in the shape of the said fairing, in order to extend the latter up to the wing the aerofoil section of which passes inside the said folded sheet, the sheet being appropriately stiffened. This sheet of material can be carried by an arm which is movable in relation to the fairing in a guide mounted therein. The translational movement of the said arm in its guide is controlled as a function of the pivotal movement of the wing, by means of mechanical linkages, so that the leading edge of the movable obturating device at all times ensures continuity between the leading edge of the fairing and that of the wing. These linkages may comprise a lever pivoting about a fixed point and connected through a rod to the sliding arm, the pivoting of this lever as a function of the pivoting movement of the wing being controlled by a bellcrank or quadrant one arm of which is connected by a rod to the said lever and the other arm of which, being of variable length, is articulated to the wing. Preferably, one or more universal or knuckle joints are provided, in order to cope with distortion of the wing during flight.

The following description, given by way of a nonlimitative example only, with reference to the accompanying drawings, illustrates how the invention may be carried into practice.

Figure 4:
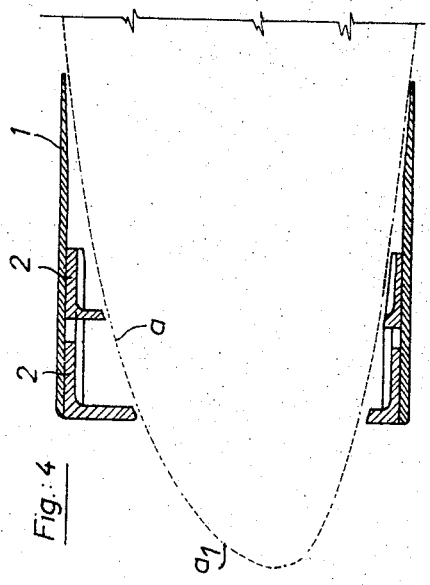
Figure 5:
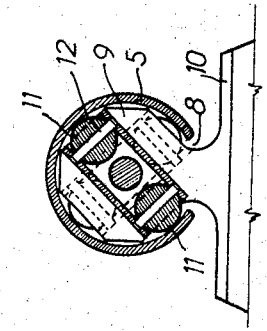
Figure 3:
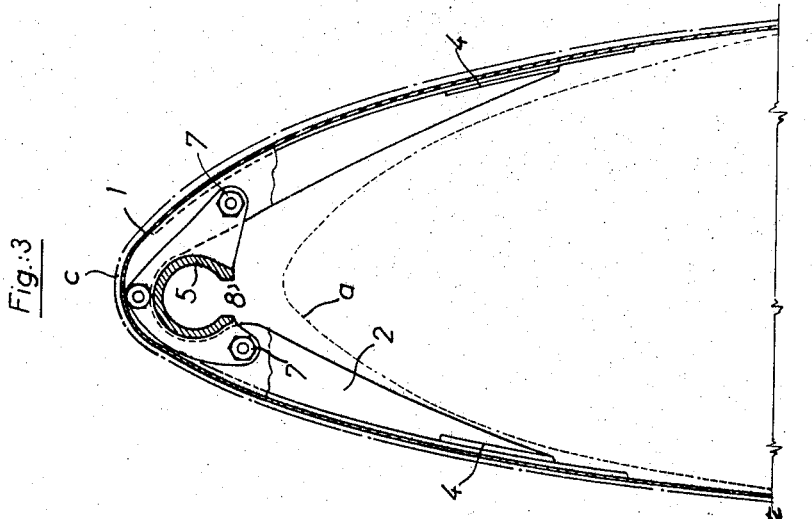

In the drawings:

FIGURE 1 schematically illustrates, in horizontal projection, one type of variable geometry aircraft to which the invention may be applied;

FIGURE 2 illustrates, on a larger scale, the fairing, the movable wing with its pivot, the obturator device and the mechanism linking the wing to the said device, the surface of the fairing and of the obturator device being cutaway and sectioned on a horizontal plane in order to show the said mechanism, and FIGURES 3, 4 and 5 are sectional views, on a larger scale, of the arrangement of FIGURE 2, respectively taken on the lines III—III, IV—IV and V—V.

FIGURE 1 shows an aircraft of which the two wings are articulated respectively about pivots $b$, arranged in the fuselage at either side of the longitudinal plane of symmetry thereof. The surface of the fuselage merges at either side into a profiled fairing $c$ within which there can engage the leading edge $a_1$ of the corresponding wing, and which serves to establish continuity of the aerodynamic surfaces in the various angular positions which the wings may occupy between the position shown in full-line and that shown in broken-line. It will be seen, however, that because of the distance between each pivot $b$ and the leading edge of the respective fairing of the corresponding wing, a gap will be produced at $d$ between the leading edge of the fairing and that of the wing when the latter is in the position of maximum sweepback which position is marked in broken-line in FIGURE 1.

The moving obturator device 1, which is shown in FIGURE 2, masks this gap and lends aerodynamic continuity thereto.

This obturator device is constituted by a sheet of material cut and folded back on itself in order to produce an aerodynamic profile corresponding to those of the fairing and the wing. This profile is inscribed within that of the fairing and circumscribes that of the wing.

The sheet of material is internally stiffened by means of ribbed stiffeners 2, the flanges of which are spot-welded or riveted 3 to the said sheet of material. These stiffeners, whose ribs taper progressively in order to accommodate the wing profile as FIGURE 3 shows, are connected to one another at one end by a gusset 4, also welded to the sheet 1 of the obturator device, in order to form a completely rigid assembly. These stiffeners also serve to fix the obturator device to a supporting arm 5, by means of lugs 6 carried by this arm and bolts 7. As FIGURE 3 and 5 show, the arm 5, which is located inside the fairing, is in the form of a tube containing a wide slot 8 in order to enable it to engage with a fixed guide support 9 mounted inside the fairing on a fixed crosspiece 10. The guide support 9 contains balls 11, distributed over its length, around its periphery and projecting from said periphery, which balls are in contact with the internal wall of the tubular arm 5. These balls, carried on spindles 12 on which they can rotate freely, enable the arm 5 to move translationally along the support 9 with a minimum of friction.

At that of its ends opposite the one which carries the obturator device 1, the arm 5 is connected through a rod 13 of adjustable length, to the free end of lever 14 which can pivot about a fixed axis 15 on the internal structure 16 of the fairing. At an intermediate point 17, the lever 14 is attached through a rod 18 to one of the arms 19 of a bellcrank which can pivot about a fixed axis 20 and whose other arm, constituted by the two portions, 21, 22, is articulated at 23 to the movable wing $a$.

The portion 21 is in the form of a hollow cylinder, open at both ends, in which the portion 22 can slide freely and in fact also project out of the left-hand extremity of portion 21 so that the bellcrank lever arm constituted by these two portions 21, 22 has a length which can vary within wide limits in accordance with the angular position of the wing $a$.

The fulcrum 20 of the hollow portion 21 is constituted by two stub journal pins disposed externally of this portion of the arm in order to leave its bore clear for the sliding movement of the rod portion 22. The journal stubs can pivot in a frame 25 which surrounds the tube 21.

The operation of the device is as follows. Commencing from the position of wing $a$ as defined in full-line in the drawing, this position corresponding to the maximum deployment of the wings, it will be seen that as soon as the pilot operates the control to pivot the wings about their respective pivots $b$ in the direction of the arrow F, in order to reduce the sweepback, the movable obturator device 1 associated with each of the wings $a$ moves in the direction indicated by the arrow $F_1$, accompanying the movement of the associated wing in such a way that the extremity $1a$ of the leading edge of the said obturator device remains as close as possible to the leading edge of the wing.

This movement on the part of the obturator is controlled by the pivoting movement of the arm 21, 22 about the axis 20 in the direction of the arrow $F_2$, the two portions 21, 22 of the arm sliding in relation to one another in order to accommodate the variation in the distance between the fixed axis 20 and the point of articulation 23 through which the arm is connected to the wing. This pivoting of the arm 21, 22 is transmitted by the arm 19 of the bellcrank and by the rod 18, to the lever 14 which pivots in the direction of the arrow $F_3$. The lever 14, through the medium of the rod 13, causes the arm 5 guided by the ball support 9, to execute a translatory motion and this produces a similar motion in the obturator device 1 attached to the arm 5.

The movements are reversible in the event of reduction of the sweepback from the position shown in broken-line to the position shown in full-line.

In order to be able to cope with distortion of the wings in flight, the point of articulation 23 may take the form of a knuckle joint and it is also advantageous to allow a certain degree of freedom to the stub journals 20 constituting the axis of the bellcrank, for example by connecting the frame 25 to the fixed structure 16 of the fairing through two knuckles 26 the axes of which are mutually perpendicular. With the same aim in mind, the rod 18 may also be linked to the arm 19 and to the lever 14 through knuckle joints.

It will be clear that the embodiments described here have been given simply by way of example and are open to modification, without departing from the scope of the invention.

What is claimed is:

1. A variable geometry aircraft comprising a fuselage, two fairings rigidly secured to and disposed symmetrically with respect to said fuselage, two wings pivotally mounted on said fairings, respectively, in a manner ensuring that aerodynamic continuity between the leading edge of each fairing and the leading edge of the corresponding wing exists in the fully deployed position, there being a region of aerodynamic discontinuity between the leading edge of each fairing and the leading edge of the corresponding wing in the fully retracted position of each wing, and a movable obturating device for each wing for maintaining said aerodynamic continuity when the wings are in a position in which said above defined aerodynamic discontinuity exists, said movable obturating device comprising a movable obturating element and a motion transmission mechanism connecting said element to the wing and adapted to move said element as a function of displacement of the wing.

2. A device according to claim 1, wherein each said obturating element is constituted by a sheet of material folded back on itself in the profile of the corresponding fairing, which sheet of material is movable within the fairing in order to project therefrom and extend the surface of the fairing to the wing, the leading edge of the wing fitting slidably inside said folded sheet of material.

3. A device according to claim 2, wherein an internal frame is combined with said sheet of material to stiffen the obturating element.

4. A device according to claim 1, including a guide mounted on the inside of the fairing parallel to the leading edge thereof, the motion transmitting mechanism including an arm carrying the obturating element and cooperating with said guide for movement therealong.

5. A device according to claim 1, wherein each said obturating element is constituted by a sheet of material folded back on itself in the profile of the corresponding fairing and an internal frame for stiffening, the motion-transmission mechanism including an arm rigid with said frame and said folded sheet of material being movable within the fairing in order to project therefrom and extend the surface of the fairing to the wing, the leading edge of the wing fitting slidably inside said folded sheet of material.

6. In a variable geometry aircraft having the wings pivotally mounted on the fuselage and fairings which provide aerodynamic continuity between the fairings and the wings in at least one position of the latter, a movable obturating device for each wing comprising in combination: a movable obturating element, guide means inside the fairing and extending parallel to the leading edge thereof, an arm carrying the obturating element and cooperating with the guide means for movement therealong, and motion-transmission elements connecting the arm to the wing and adapted to move said arm as a particular function of the movement of the wing which causes the gap between the leading edge of the fairing and the wing to be closed by the obturating element in all wing positions, said motion-transmission elements comprising a lever pivoting about a fixed point, a first rod linking said lever to the guided arm, a bellcrank having one arm pivoted to the wing, and a second rod connecting the other arm of said bell-crank to said lever.

7. An aircraft according to claim 6, wherein the said elements are connected by means of joints adapted to accommodate distortion of the wing during flight.

References Cited
UNITED STATES PATENTS

| | | | |
|---|---|---|---|
| 3,053,484 | 9/1962 | Alford et al. | 244—46 X |
| 3,064,928 | 11/1962 | Toll | 244—46 |
| 3,270,989 | 9/1966 | Polhamus et al. | 244—46 |
| 3,292,881 | 12/1966 | Ricard | 244—46 |

MILTON BUCHLER, Primary Examiner

JEFFERY L. FORMAN, Assistant Examiner

U.S. Cl. X.R.

244—130